US006723399B2

(12) United States Patent
Chundury et al.

(10) Patent No.: US 6,723,399 B2
(45) Date of Patent: Apr. 20, 2004

(54) MEDICAL MULTILAYER FILM STRUCTURE

(75) Inventors: Deenadayalu Chundury, Newburgh, IN (US); L. Steven Edge, Evansville, IN (US); Kenneth D. Zabielski, McHenry, IL (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 10/170,025

(22) Filed: Jun. 12, 2002

(65) Prior Publication Data

US 2003/0232212 A1 Dec. 18, 2003

(51) Int. Cl.[7] .............................................. B32B 27/08
(52) U.S. Cl. .................... 428/35.2; 428/35.7; 428/36.8; 428/516; 428/517; 428/521
(58) Field of Search ............................... 428/35.2, 35.7, 428/36.8, 516, 517, 521

(56) References Cited

U.S. PATENT DOCUMENTS

| 4,210,686 A | 7/1980 | Gajewski et al. |
| 4,322,465 A | 3/1982 | Webster |
| 4,966,795 A | 10/1990 | Genske et al. |
| 5,079,283 A | 1/1992 | Burditt et al. |
| 5,106,696 A | 4/1992 | Chundury et al. |
| 5,116,540 A | 5/1992 | Chundury et al. |
| 5,194,482 A | 3/1993 | Chundury et al. |
| 5,264,280 A | 11/1993 | Chundury et al. |
| 5,274,035 A | 12/1993 | Chundury |
| 5,278,231 A | 1/1994 | Chundury |
| 5,317,059 A | 5/1994 | Chundury et al. |
| 5,321,081 A | 6/1994 | Chundury et al. |
| 5,374,680 A | 12/1994 | Chundury et al. |
| 5,385,781 A | 1/1995 | Chundury et al. |
| 5,496,604 A | 3/1996 | Andersson et al. |
| 5,598,927 A | 2/1997 | Ikenoya et al. |
| 5,601,889 A | 2/1997 | Chundury et al. |
| 5,658,625 A * | 8/1997 | Bradfute et al. ........... 428/34.9 |
| 5,681,627 A | 10/1997 | Mueller |
| 5,722,539 A | 3/1998 | Ikenoya et al. |
| 5,732,825 A | 3/1998 | Ikenoya et al. |
| 5,849,128 A | 12/1998 | Kobinata et al. |
| 5,945,187 A | 8/1999 | Buch-Rasmussen et al. |
| 5,969,027 A | 10/1999 | Chundury et al. |
| 6,150,442 A | 11/2000 | Chundury et al. |
| 6,242,532 B1 | 6/2001 | Baumgartner et al. |
| 6,261,655 B1 | 7/2001 | Rosenbaum et al. |

FOREIGN PATENT DOCUMENTS

| WO | WO 92/14784 | 9/1992 |
| WO | WO 00/07809 | 2/2000 |

* cited by examiner

Primary Examiner—D. S. Nakarani
(74) Attorney, Agent, or Firm—Rankin, Hill, Porter & Clark LLP

(57) ABSTRACT

The present invention provides a coextruded multilayer thermoplastic film structure for use in forming a medical fluid container such as an I.V. bag. A coextruded multilayer thermoplastic film structure according to the invention includes at least three layers. The first layer (A), which is the layer that contacts medical fluids such as, for example, saline solutions, lactated Ringers solutions, and the like, includes a mixture of a major part of a homopolymer or copolymer of polypropylene and a minor part of a block polymer of a vinyl aromatic monomer and a conjugated diene, a partially hydrogenated derivative thereof, or a selectively hydrogenated derivative thereof to which has been grafted a unsaturated carboxylic reagent. The second layer (B), which is melt bonded to the first layer (A), includes a block polymer of a vinyl aromatic monomer and a conjugated diene, a partially hydrogenated derivative thereof, or a selectively hydrogenated derivative thereof to which has been grafted a unsaturated carboxylic reagent. The third layer (C), which is melt bonded to the second layer (B), includes a homopolymer or copolymer of polypropylene.

12 Claims, No Drawings

MEDICAL MULTILAYER FILM STRUCTURE

BACKGROUND OF THE INVENTION

1. Field of Invention

The present invention relates to a coextruded multilayer thermoplastic film structure for use in forming medical fluid containers.

2. Description of Related Art

Medical fluid containers (e.g., IV bags) are used to collect, process, store, transport, and ultimately deliver (typically via medical tubing) medical fluids (e.g., saline solutions and lactated Ringers solutions) to patients. The material used to fabricate medical containers of this type must possess a unique combination of properties. For example, to facilitate visual inspection for contaminants, the material used to fabricate the container must be optically transparent (i.e., see through) or exhibit contact clarity (i.e., visual inspection of the contents can be made when the container is laid on a surface). The material must be also be sufficiently flexible to permit the container walls to be fully collapsed prior to filling to prevent the introduction of air into the container during filling, but also sufficiently strong to resist rupture and/or puncture. It is also important that the material be able to retain its flexibility and strength over a wide range of temperatures. Filled medical fluid containers are frequently transported in the cargo bays of non-pressurized aircraft at high altitudes where temperatures of −40° C. or lower and low atmospheric pressures are often encountered. Moreover, some premixed drug solutions are stored and transported in medical fluid containers at temperatures as low as 40° C. to minimize drug degradation. In addition, the material must also be able to withstand various sterilization processes including, for example, high temperature (e.g., 121° C.) steam sterilization treatment, gamma radiation treatment, and/or ethylene oxide treatment.

The material used to fabricate medical fluid containers must also be environmentally friendly. In other words, the material should not leach out low molecular weight components when disposed of in landfills. Furthermore, the material should minimize the formation of acids upon incineration.

It is believed that it may be desirable in some applications for the material be free from or have a low content of additives such as plasticizers, stabilizers and the like that could possibly be released into the medications or biological fluids or tissues thereby possibly causing danger to patients using such devices or are contaminating the substances being stored or processed in such devices. For containers which hold solutions for intravenous transfusion, such contamination could make its way into the transfusion pathway and into the patient possibly causing injury to the patient.

Flexible polyvinyl chloride ("PVC") is one of the most cost effective materials for constructing devices, which meet some of the above requirements. However, concerns have been raised in recent years that flexible PVC may generate objectionable amounts of hydrogen chloride (or hydrochloric acid when contacted with water) upon incineration, which can cause corrosion of the incinerator. Efforts have been undertaken in recent years to develop PVC-free materials for constructing medical containers.

BRIEF SUMMARY OF THE INVENTION

The present invention provides a PVC-free coextruded multilayer thermoplastic film structure for use in forming a medical fluid container such as an IV bag. A multilayer thermoplastic film structure according to the invention comprises at least three layers. The first layer (A), which is the inner layer that contacts the medical fluid, comprises a mixture of a major part of a homopolymer or copolymer of polypropylene and a minor part of a block polymer of a vinyl aromatic comonomer and a conjugated diene, a partially hydrogenated derivative thereof, or a selectively hydrogenated derivative thereof to which has been grafted an unsaturated carboxylic reagent. The second layer (B), which is melt bonded to the first layer (A), comprises a block polymer of a vinyl aromatic comonomer and a conjugated diene, a partially hydrogenated derivative thereof, or a selectively hydrogenated derivative thereof to which has been grafted a unsaturated carboxylic reagent. The third layer (C), which is melt bonded to the second layer (B), comprises a homopolymer or a copolymer of polypropylene.

In a preferred embodiment of the invention, the multilayer thermoplastic film structure according to the invention is formed as a coextruded blown film. The first layer (A) comprises a mixture comprising a major amount of a propylene-ethylene random copolymer, a minor amount of a styrene-ethylene/butylene-styrene block copolymer, and optionally a hindered phenolic primary antioxidant and an anti-blocking agent. The second layer (B) consists essentially of a styrene-ethylene/butylene-styrene block copolymer and optionally a hindered phenolic primary antioxidant. And, the third layer (C) consists essentially of a propylene-ethylene random copolymer and optionally a hindered phenolic primary antioxidant.

The multilayer thermoplastic film structure according to the invention can be formed into medical containers such as IV bags by heat sealing a first layer (A) to another first layer (A), such as when a coextruded bubble of film is collapsed on itself. Medical containers formed from the coextruded multilayer thermoplastic film structure according to the invention exhibit excellent optical clarity and/or contact clarity both before and after steam sterilization, a lower heat sealing temperature, excellent gas and liquid permeability barrier properties, and remain flexible, tough, and tear resistant over a wide range of service temperatures. The coextruded multilayer thermoplastic film structure is environmentally friendly.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a plasticized PVC-free coextruded multilayer thermoplastic film structure for use in forming a medical fluid container such as an IV bag. The term "plasticized PVC-free" means that the thermoplastic film structure does not contain any PVC and/or PVC plasticizers. A coextruded multilayer thermoplastic film structure according to the invention comprises at least three layers. The first layer (A) is the inner layer that contacts medical fluids such as, for example, saline solutions, lactated Ringers solutions, and the like. The first layer (A) can be melt bonded to another first layer (A) using conventional heat sealing technology. The second layer (B) is melt bonded to the first layer (A). The third layer (C) is melt bonded to the second layer (B). In the preferred embodiment of the invention, all three layers (A), (B), and (C) are coextruded simultaneously and formed into a multilayer thermoplastic film structure by blowing a bubble (upwardly or downwardly) without the use of any glues or adhesives. The coextruded multilayer thermoplastic film structure can also be coextruded as a flat sheet.

First Layer (A)

The first layer (A) of the multilayer thermoplastic film structure according to the invention comprises a mixture of a major part of a homopolymer or copolymer of polypropylene, a minor part of a block polymer, and optionally a hindered phenolic primary antioxidant stabilizer. Throughout the instant specification and in the appended claims, the term "major amount" means an amount equal to or greater than 50% by weight, and the term "minor amount" means an amount less than about 50% by weight. The mixture preferably comprises, by weight, from about 60% to about 95%, more preferably from about 70% to about 90%, and most preferably about 80%, of one or more homopolymers or copolymers of polypropylene and optionally a hindered phenolic primary antioxidant stabilizer.

The homopolymers or copolymers of polypropylene used in the mixture are preferably semi-crystalline homopolymers or copolymers of polypropylene having a number average molecular weight above about 10,000, and more preferably above about 50,000. There are many such homopolymers or copolymers of polypropylene commercially available, and their properties are well known to those skilled in the art.

Preferably, a random propylene-ethylene copolymer comprising from about 2 to about 10 percent by weight, and more preferably from about 2.2 to about 6 percent by weight, ethylene is used. A particularly preferred propylene-ethylene copolymer has an ethylene content of about 5 weight percent. Copolymers made using a metallocene catalyst and/or an equivalent single site metal catalyst are also preferred.

The block polymer used in the mixture is preferably a block polymer of a vinyl aromatic monomer and a conjugated diene, a partially hydrogenated derivative thereof, or a selectively hydrogenated derivative thereof to which has been grafted an unsaturated carboxylic reagent. The block polymer preferably contains up to about 50% bound vinyl aromatic monomer.

The block polymers are preferably formed by anionic polymerization. Such block copolymers may be diblock, triblock, multiblock, starblock, polyblock or graftblock polymers. The commercially available elastomeric grades sometimes include combinations of these types. Throughout this specification and claims, the terms diblock, triblock, multiblock, polyblock, and graft or grafted-block with respect to the structural features of block polymers are to be given their normal meaning as defined in the open literature such as in the *Encyclopedia of Polymer Science and Engineering*, Vol. 2, (1985) John Wiley & Sons, Inc., New York, pp. 325–326, and by J. E. McGrath in *Block Copolymers*, Science Technology, Dale J. Meier, Ed., Harwood Academic Publishers, 1979, at pages 1–5.

Such block copolymers may contain various ratios of conjugated dienes to vinyl aromatic monomer. Accordingly, multiblock polymers may be utilized which are linear or radial symmetric or asymmetric and which have structures represented by the formulae A-B, A-B-A, A-B-A-B, B-A-B, $(AB)_{0,1,2...}$ BA, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known anionic polymerization procedures including sequential addition of monomer, incremental addition of monomer, or coupling techniques as illustrated in, for example, U.S. Pat. Nos. 3,251,905; 3,390,207; 3,598,887; and 4,219,627. As is well-known, tapered polymer blocks can be incorporated in the multiblock copolymers by copolymerizing a mixture of conjugated diene and vinyl aromatic monomer monomers utilizing the difference in their copolymerization reactivity rates. Various patents describe the preparation of multiblock copolymers containing tapered copolymer blocks including U.S. Pat. Nos. 3,251,905; 3,639,521; and 4,208,356, the disclosures of which are hereby incorporated by reference. Anionic polymerization is preferred because it allows for precise control over the molecular weight (MW) and molecular weight distribution (MWD) of these block copolymers. It is possible to obtain a MWD that is extremely narrow, for example, (Mw/Mn=1).

Conjugated dienes that may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Melt mixtures of these conjugated dienes also may be used. The preferred conjugated dienes are isoprene and 1,3-butadiene.

The vinyl aromatic monomers which may be utilized to prepare the copolymers include styrene and the various substituted styrenes. In one embodiment, the vinyl aromatic monomer is represented by the following formula:

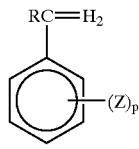

wherein R is hydrogen, an alkyl group containing from 1 to about 6 carbon atoms, or a halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyl toluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 500,000, preferably from about 40,000 to about 300,000.

The number average molecular weights of the individual blocks within the polymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the block polymer is from about 10% to about 80%, and the vinyl content is preferably from about 20% to about 60%, particularly 25% to 50% when it is desired that the modified block polymer exhibit rubbery elasticity. The vinyl content of the block polymer can be measured by means of nuclear magnetic resonance.

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, alpha-methylstyrene-isoprene-alpha-methylstyrene, and their partially hydrogenated derivatives. The diblock and triblock polymers are commercially available from a variety of sources under various trade names. Melt blends of diblock and triblock polymers are also available. Multiblock polymers of styrene and either isoprene or butadiene also are commercially available, as are radial or starblock copolymers.

The selective hydrogenation of the block polymers may be carried out by a variety of well-known processes including hydrogenation in the presence of such catalysts as Raney nickel, noble metals such as platinum, palladium, etc., and soluble transition metal catalysts. Suitable hydrogenation processes which can be used are those wherein the diene-containing polymer or polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5% to about 20% of their original unsaturation content prior to hydrogenation.

In one embodiment, the conjugated diene portion of the block polymer is at least 90% saturated and more often at least 95% saturated while the vinyl aromatic portion is not significantly hydrogenated. Particularly useful hydrogenated block polymers are the hydrogenated block polymers of styrene-isoprene-styrene such as an (ethylene/propylene)-styrene block polymer. When a polystyrene-polybutadiene-polystyrene block polymer is hydrogenated, it is desirable that the 1,2-polybutadiene to 1,4-polybutadiene ratio in the polymer is from about 30:70 to about 70:30. When such a block polymer is hydrogenated, the resulting product resembles a regular polymer block of ethylene and 1-butene (EB). As noted above, when the conjugated diene employed is isoprene, the resulting hydrogenated product resembles a regular polymer block of ethylene and propylene (EP). The presently most preferred block polymer is a hydrogenated triblock compolymer comprising about 30% by weight styrene end blocks and about 70% by weight of a rubbery poly(ethylene-butylene) mid block. This hydrogenated block polymer is often referred to as a styrene-ethylene/butylene-styrene block (SEBS) copolymer.

In another embodiment, the selectively hydrogenated block polymer is of the formula:

where: n=0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic monomer block having a number average molecular weight of from about 2000 to about 115,000; the blocks of A constituting about 5% to about 95% by weight of the polymer; and the unsaturation of the block B is less than about 10% of the original unsaturation. In other embodiments, the unsaturation of block B is reduced upon hydrogenation to less than 5% of its original value, and the average unsaturation of the hydrogenated block polymer is reduced to less than 20% of its original value.

The block polymers of the vinyl aromatic monomer and the conjugated diene may also be grafted with one or more of the above described unsaturated monocarboxylic or dicarboxylic reagents. The carboxylic reagents include carboxylic acids per se and their functional derivatives such as anhydrides, imides, metal salts, esters, etc., which are capable of being grafted onto the selectively hydrogenated block polymer. The grafted polymer will usually contain from about 0.05% to about 20%, and preferably from about 0.1% to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preparation of various selectively hydrogenated block polymers of conjugated dienes and vinyl aromatic monomers which have been grafted with a carboxylic acid reagent is described in a number of patents including U.S. Pat. Nos. 4,578,429, 4,657,970, and 4,795,782, and the disclosures of these patents relating to grafted selectively hydrogenated block polymers of conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder (See Col. 8, lines 40–61).

The mixture can further optionally comprise up to about 0.5% of one or more hindered phenolic primary antioxidants. Particularly useful hindered phenolic primary antioxidants are available, for example, from Clariant Corporation of Charlotte, N.C., as HOSTANOX® O 10 or O 3, from Albemarle Corporation of Baton Rouge, La. as ETHANOX® 330, and from Ciba Specialty Chemicals, Tarrytown, N.J., as IRGANOX® 1010 or IRGANOX® 3114.

Second Layer (B)

The second layer (B) comprises a major amount of a block polymer such as previously described above and minor amounts of one or more homopolymers or copolymers of polypropylene. Preferably, the second layer (B) comprises at least about 75% by weight of one or more block polymers. In the presently most preferred embodiment of the invention, the second layer (B) consists essentially of a styrene-ethylene/butylene-styrene block (SEBS) copolymer.

Virtually all polymeric materials, whether of synthetic or natural origin, undergo reactions when exposed to oxygen. Depending upon the polymer and its end use application, stabilizers play an important role in preventing or inhibiting the oxidation of the polymer as a result of heat, shear, UV radiation and such. This can occur both during processing and during the lifetime of use of the end-product, where physical and mechanical properties may be damaged by heat, shear or radiation degeneration. Many different stabilizers can be used, with the particular stabilizer being selected according to the material and the protection required. Hindered phenols are radical scavengers that prevent thermal degradation of many organics and polymeric materials. Phosphites stabilizers are excellent peroxide decomposers, halogen acceptors and masking agents, which providing good heat stability, color stability, process stability and weatherability. Thioesters decompose polymeric peroxides into inert substance, and exhibit remarkable synergism in combination with primary hindered phenols. Stabilizers are conventionally used in very small amounts, typically less than about 1% by weight. Examples of primary anti-oxidant (hindered phenols) stabilizers are IRGANOX®) 1010 (Ciba) or HASTANOX® O 10 (Clariant).

Third Layer (C)

The third layer (C) comprises a major amount of one or more homopolymers or copolymers of polypropylene and optionally contains a hindered phenolic primary antioxidant, such as previously described. More preferably, the third layer (C) comprises at least about 75% by weight of one or more homopolymers or copolymers of polypropylene. In the presently most preferred embodiment of the invention, the third layer (C) consists essentially of one or more ethylene-propylene copolymers.

Preparation of Multilayer Thermoplastic Film Structures

A multilayer thermoplastic film structure in accordance with the present invention can be prepared as a coextruded blown film using conventional blown film equipment, which is well known in the art. In the preferred method, the resins comprising the mixture to be extruded as the first layer (A) are melt mixed in an extruder, and the resin or resins to be extruded as the second layer (B) and third layer (C) are placed into separate melt chambers. The resins used are preferably in pellet form for ease of processing, but resin powders or crumb form can also be used. The three layers comprising the multilayer thermoplastic film structure according to the invention are then coextruded into a multi-manifold coextrusion blown film die. Each manifold receives a molten feed stream from a separate independent extruder. The extruders are typically horizontally mounted, but may be vertically mounted. The extruders may face in any direction so long as each extruder feeds into the appropriate port of the multi-manifold coextrusion die.

As is well known in the art, extruders have adjustable speeds. Pressures can be regulated with screen packs, breaker plates, and/or reducing orifices, so that the desired amount of material is delivered for each layer. The thickness of each layer may also be regulated by an adjustable or fixed circular die lip for each layer within the die, or by adjusting the speed of the haul off tensioning, or by the use of a combination of any of the above three methods.

At the molten materials exit point, all three layers are melded together as one three-layered structure in the shape of an inflated tubular bubble. The bottom of the bubble is then pinched off using a pair of nip rollers (each of which can be rubber or steel, or one roller can be rubber and the other roller can be steel), and the bubble is filled with air at an approximate blow up ratio of about from 1.0:1 to about 1.3:1, but may exceed these ratios based on the desired shrinkage. The bubble is inflated to the desired circumference. The circumference may be monitored and adjusted automatically by using an automated or manual inflator system. The automatic inflator system may be controlled by single or multiple infra red (IR) sensors, and/or reflectors for the IR beam.

Once the bubble is inflated evenly, the bubble is cooled. The bubble may then be cooled by passing the bubble through an air ring and a cascade of water. Preferably, the water is kept as cold as possible, as the quenching temperature is related to the clarity of the film. The outside molten surfaces are cooled first, and cooling occurs inward toward the inner layer of the bubble predominantly with water. The cooling water may be disposed of or recycled, but is typically re-cycled after filtering.

After the blown film is partially cooled, it is sequentially collapsed and the cooling and bubble maintenance air becomes entrapped. The blown film passes through cascading water, which cools the entire finished film. Once the film is collapsed and cooled, the film can be surface modified by using a corona treatment to enhance reception of printing or marking inks or foils. The blown film is then rolled up on a taper tension-monitored winder, which has either a single turret or double turret take-up system. The winders are ideally automated using the principle of tapering the tension as the roll diameter builds up, thus applying an even tension from the start of the wound roll to the desired roll diameter. The edges can be in-line slitted and separated and diverted to a non-related recycling storage bin.

Once the film is collapsed and the layers are flattened, the collapsed bubble allows the first layer (A), which is a sealing layer (in that it is heat sealable to another first layer (A)), to be in close proximity to an opposing first layer (A). The collapsed bubble, when flattened, allows the third layer (C) to completely surround the bubble. Accordingly, when the bubble is flattened, the layers from top to bottom are arranged as follows: (C)(B)(A)-(center of collapsed bubble)-(A)(B)(C).

Medical Fluid Containers

The present invention also provides medical fluid containers formed from the coextruded multilayer thermoplastic film structure previously described. Preferably, medical fluid containers in accordance with the invention are formed by heat sealing two first layers (A) together using conventional heat sealing equipment. Heat sealing can typically be accomplished at a temperature within the range of from about 150–170° C.

Medical fluid containers in accordance with the present invention are particularly suitable for use in collecting, processing, storing, transporting, and ultimately delivering (typically via medical tubing) medical fluids (e.g., saline solutions and lactated Ringers solutions) to patients. Medical fluid containers according to the invention exhibit excellent optically transparency (i.e., see through) and/or contact clarity (i.e., visual inspection of the contents can be made when the container is laid on a surface), which facilitates visual inspection of the container contents.

Medical fluid containers in accordance with the invention are sufficiently flexible to permit the container walls to be fully collapsed prior to filling to prevent the introduction of air into the container during filling, but also sufficiently strong to resist rupture and/or puncture. Filled medical fluid containers according to the invention can be transported on non-pressurized aircraft cargo areas at high altitudes where temperatures of −40° C. or lower and low atmospheric pressures are often encountered, and can withstand various sterilization processes including, for example, high temperature (e.g., 121° C.) steam treatment, gamma radiation treatment, and/or ethylene oxide treatment.

Medical fluid containers in accordance with the present invention are plasticized PVC-free. The medical fluid containers do not leach out low molecular weight components when disposed of in land fills. Furthermore, the medical fluid containers minimize the formation of acids upon incineration, and are generally recyclable.

The following examples are intended only to illustrate the invention and should not be construed as imposing limitations upon the claims.

EXAMPLE 1

A three layer thermoplastic film structure was formed as described above as a coextruded blown film. The first layer (A) was a mixture consisting of 79.9% by weight of a random ethylene-propylene copolymer (ATOFINA Z9450), 20.0% by weight of a styrene-ethylene/butylene-styrene block (SEBS) copolymer (KRATON G-1652), and 0.1% by weight of a hindered phenolic primary antioxidant (ETHANOX 330). The second layer (B) consisted of 99.9% by weight of a styrene-ethylene/butylene-styrene block (SEBS) copolymer (KRATON G-1652) and 0.1% by weight of ALKANOX® 240 (from Great Lakes Chemicals). The third layer consisted of 100% by weight of a random ethylene-propylene copolymer (HUNTSMAN 23M5). The layers were coextruded to form a film having a total thickness of about 7.5 mils. The thickness of the first layer (A) was determined to be about 1.9 to about 2.9 mils. The thickness of the second layer (B) was determined to be about 1.7 to about 2.1 mils. And, the thickness of the third layer (C) was determined to be about 3.2 to about 3.4 mils. The multilayer thermoplastic film structure exhibit excellent clarity, flexibility, and strength.

EXAMPLE 2

The multilayer thermoplastic film structure formed in Example 1 was subjected to permeability testing. Multiple permeability tests were performed for each of three gases (carbon dioxide, nitrogen, and oxygen) and for water vapor. Oxygen permeability testing was conducted in accordance with ASTM Standard D3985. Water vapor transmission testing was conducted in accordance with ASTM Standard F1249. For carbon dioxide and nitrogen permeability testing, the same general procedures set forth in ASTM Standard F1249 were used, except the test procedure was modified to use a sensor appropriate for such gasses. All testing was conducted at 85% relative humidity and at 23° C. The results of the permeability testing are shown in Table 1 below (the values reported in Table 1 below for $C_2$, $N_2$ and $O_2$ are in $cc/m^2/day$, and for $H_2O$ Vapor are $g/m^2/day$):

TABLE 1

|  | $CO_2$ | $N_2$ | $O_2$ | $H_2O$ Vapor |
|---|---|---|---|---|
| High | 2952 | 233.0 | 1482 | 0.900 |
| Average | 2847 | 219.5 | 1442 | 0.870 |
| Low | 2752 | 206.0 | 1403 | 0.847 |

EXAMPLE 3

A medical fluid container was formed from the multilayer thermoplastic film structure formed in Example 1. Specifically, two sheets of the multilayer thermoplastic film structure were oriented such that the first layers (A) were in contact with each other. The two sheets of film were heat sealed together using conventional heat sealing equipment at about 150–170° C. to form a 0.5 L IV bag. The bag was then filled with approximately 500 cc of water. The water-filled bag was then placed on a laboratory bench. A wooden block having smoothed edges measuring approximately 4 inches by 8 inches was placed on the bag and a total of 380 pounds of weight was placed onto the wooden block to exert pressure on the bag. The bag did not rupture, and no heat seal failure was noted.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A coextruded multilayer thermoplastic film structure comprising:
    a first layer (A) comprising a mixture of a major amount of a homopolymer or copolymer of polypropylene and a minor amount of a block polymer of a vinyl aromatic monomer and a conjugated diene, a partially hydrogenated derivative thereof, or a selectively hydrogenated derivative thereof to which has been grafted a unsaturated carboxylic reagent;
    a second layer (B) melt bonded to said first layer (A), said second layer (B) comprising a major amount of a block polymer of a vinyl aromatic monomer and a conjugated diene, a partially hydrogenated derivative thereof, or a selectively hydrogenated derivative thereof to which has been grafted an unsaturated carboxylic reagent; and
    a third layer (C) melt bonded to said second layer (B), said third layer (C) comprising a major amount of a homopolymer or copolymer of polypropylene.

2. The coextruded multilayer thermoplastic film structure according to claim 1 wherein the block polymer in the mixture in the first layer (A) comprises a styrene-ethylene/butylene-styrene block copolymer.

3. The coextruded multilayer thermoplastic film structure according to claim 1 wherein the block polymer in the second layer (B) comprises a styrene-ethylene/butylene-styrene block copolymer.

4. The coextruded multilayer thermoplastic film structure according to claim 3 wherein said second layer (B) consists essentially of a styrene-ethylene/butylene-styrene block copolymer and optionally one or more stabilizers.

5. The coextruded multilayer thermoplastic film structure according to claim 1 wherein said copolymer of polypropylene in said first layer (A) and said third layer (C) comprises an ethylene-propylene copolymer.

6. The coextruded multilayer thermoplastic film structure according to claim 1 wherein any of said layers (A), (B) and/or (C) further comprises one or more stabilizers.

7. The coextruded multilayer thermoplastic film structure according to claim 1 wherein said multilayer thermoplastic film structure is formed as an upwardly or downwardly blown film.

8. A medical I.V. fluid container comprising a bag formed from a coextruded thermoplastic multilayer film structure according to claim 1.

9. A coextruded thermoplastic multilayer film structure for use in forming an I.V. medical fluid container comprising: a first layer (A) for contacting medical fluid, said first layer (A) consisting essentially of a mixture of from about 70% to about 90% by weight of a propylene-ethylene copolymer, from about 10% to about 30% by weight of a styrene-ethylene/butylene-styrene block copolymer, and optionally up to about 0.5% by weight of a hindered phenolic primary antioxidant; a second layer (B) melt bonded to said first layer (A), said second layer (B) consisting essentially of a styrene-ethylene/butylene-styrene block copolymer and less than 2.0% by weight of one or more stabilizers; and a third layer (C) melt bonded to said second layer (B), said third layer (C) consisting essentially of a propylene-ethylene copolymer.

10. A medical fluid container comprising a bag formed from a coextruded thermoplastic multilayer film structure according to claim 9.

11. The coextruded multilayer thermoplastic film structure according to claim 9 wherein any of said layers (A), (B) and/or (C) further comprises one or more stabilizers.

12. The coextruded multilayer thermoplastic film structure according to claim 9 wherein said multilayer thermoplastic film structure is formed as an upwardly or downwardly blown film.

* * * * *